2,751,779

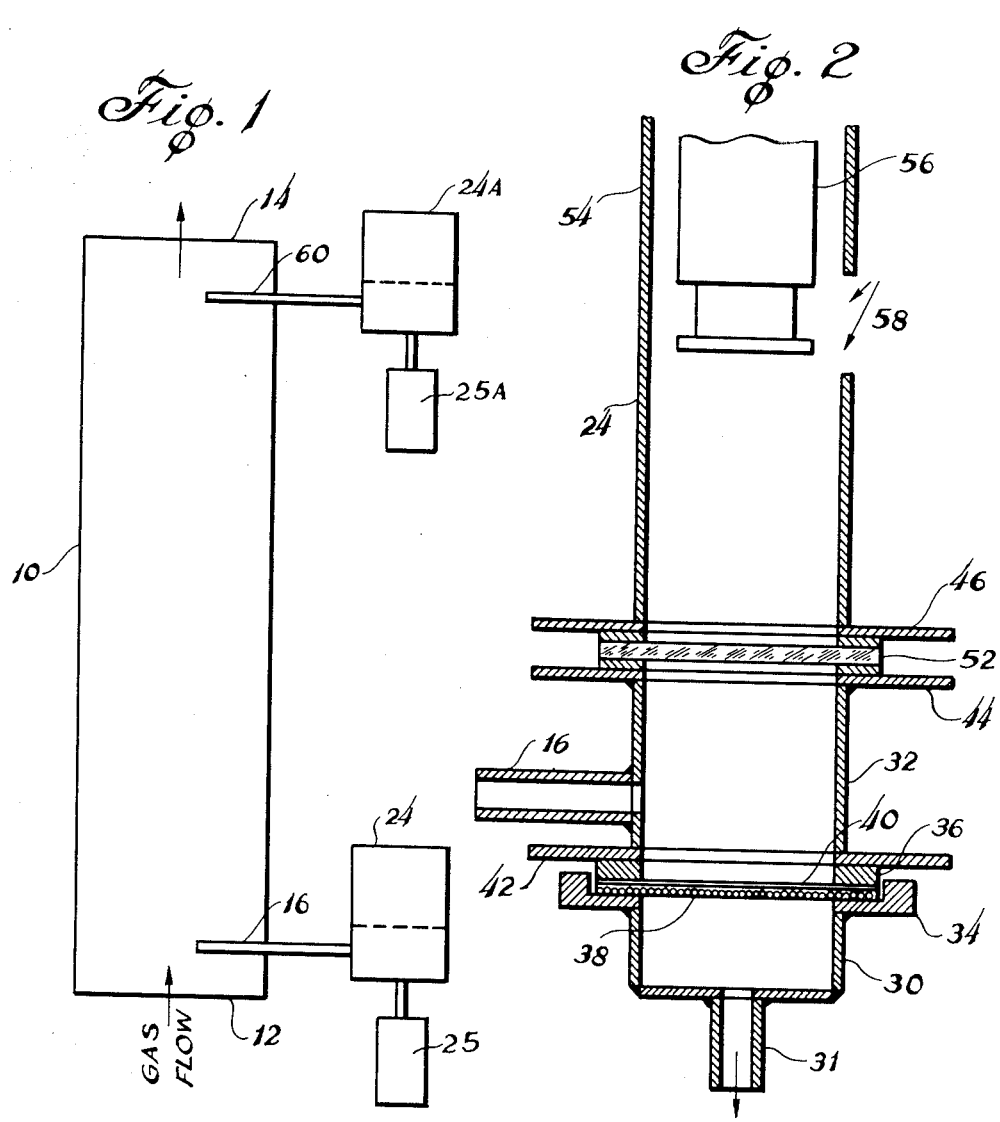

METHOD FOR FINDING THE EFFICIENCY OF GAS CLEANING APPARATUS

Peter Hodson and David G. Peterson, Wellsville, N. Y., assignors, by mesne assignments, to Apra Precipitator Corporation, New York, N. Y., a corporation of Delaware Application July 30, 1954, Serial No. 446,902

5 Claims. (Cl. 73—38)

The present invention relates broadly to dust collectors of a conventional type and in particular it relates to a novel arrangement for photographically determining the efficiency of a dust collector during periods of continuous operation.

A conventional dust collector receives dirty gas at its inlet end and after subjecting it to electrostatic or mechanical cleaning operations so as to separate a large portion of the suspended dust particles from the gas stream discharges the cleaned gas to an exhaust duct where it is returned to the atmosphere or channeled to any selected point of usage.

Heretofore, it has been difficult to accurately ascertain the efficiency of a gas cleaning operation and so it becomes a primary object of this invenion to provide testing means which accurately determines the efficiency by which a standard cleaning device removes dust or other foreign particles from a moving gas stream.

A more particular object of this invention is to provide photographic means which presents an accurate indication of the cleaning efficiency of a gas cleaning device.

With this object in view, as well as other objects which may appear during the disclosure of this application, reference may be had to the accompanying drawings in which:

Figure 1 diagrammatically illustrates a cleaning device having in combination a photographic tester as embodied in this invention.

Figure 2 is an enlarged sectional drawing showing the specific details of a photographic blackness tester constructed as an illustrative form of this invention.

Generally the testing arrangement of this invention comprises a system whereby samples of flue gas are simultaneously drawn through filter discs at both the inlet and outlet ends of a mechanical or electrostatic cleaning device housing. A sample of dust entraining gas is drawn from the inlet end of the gas cleaner and passed through a fitler disc in the photographic blackness tester for a predetermined period of time, after which a photograph of the filter is taken to record the intensity of discoloration due to filtered deposits. This photograph provides an indication of the amount of dust or other foreign particles entrained in the gas stream at the inlet end of the cleaning device.

Simultaneously with the filtering action at the inlet end of the gas cleaner, a second sample of gas is drawn through a similar filtering medium at the clean gas outlet. This filtering medium is arranged in a housing which supports a motion picture camera in the proper attitude necessary to obtain a continuous motion picture of the filter. Consequently, as filterable deposits are removed from the gas stream by the filter disc, the motion picture camera is continuously recording its changing appearance until such time as the disc is substantially darker than the filter disc at the gas inlet end of the gas cleaning device. The single photograph from the inlet end filter and the continuous strip of motion picture film from the outlet end filter are then developed under constantly controlled conditions so the quality of the films will be nearly indentical and an accurate comparison may be made.

In the drawings the numeral 10 designates a housing for an electrostatic dust precipitator or a mechanical dust collector having an inlet 12 where dirty gas flows into the housing and an outlet 14 where the cleaned gas is discharged to a point of usage or vented to the atmosphere.

At a point adjacent the inlet end of the housing, a sampling tube 16 extends through the housing wall to enable dirty gas to be drawn therethrough and directed to inlet 20 of the blackness indicator 24, Figure 2.

The blackness indicator 24 comprises a housing divided into an outlet section 30 having outlet 31 such as a pump or aspirator which draws dirty gas through inlet 20 of the center section 32. Outlet section 30 has a cupped flange 34 bonded to one end thereof and arranged to receive an end portion of center section 32. Seated within the cup shaped flange 34 is a wire mesh screen 38 which supports a filter disc 40. A resilient gasket 35 is compressed between sections 30 and 32 by the spring-lock joint 42 which holds the filter and filter support screen firmly positioned between the housing sections.

The end section 32 opposite spring lock joint 42 comprises a flange 44 adapted to be bolted to a similar flange 46 at the lower end of housing section 48. A plane glass lens 52 is inserted between flanges 44 and 46 before the flanges are bolted or otherwise joined together to provide a gas tight connection whereby gas entering the housing section 36 is precluded from passing into housing section 48. The housing 48 is open at its distal end 54 to receive a camera 56. An opening 58 located in the side of housing 48 provides ingress for light necessary to illuminate filter disc 40 to the degree required for proper photography.

At a point adjacent outlet 14 of housing 10 a second sampling tube 60 is inserted into the clean gas stream to allow cleaned gas to be drawn off to a second blackness tester 24A in the same manner as dust entrained gas is drawn through sampling tube 16 to blackness tester 24. The only difference between blackness tester 24 and blackness tester 24A is that the former tester is provided with a "still" or single exposure type camera while the latter is provided with a continuously operating multiple exposure or motion picture camera.

To determine the efficiency of the gas cleaning device being tested, it is only necessary to compare the "still" photograph taken at the dirty gas end of the cleaning device housing with the continuous strip of motion picture film taken at the gas outlet end of the cleaning device housing. The motion picture film is reviewed until a frame of film is found to match an intensity of discoloration the single frame photograph taken at the dirty gas inlet end of the housing. This matching may be done by conventional photometric methods and therefore forms no part of this invention. Since a definite period of time is required to make a single frame exposure on the motion picture film, the time required to achieve a condition wherein the clean or outlet end filter is equal in discoloration to the inlet end filter may be determined by counting the number of photographic frames in the strip of motion picture film exposed prior to the frame having a discoloration equal in intensity to that of the single timed photograph of the dirty gas inlet filter disc.

Since the exact time the dirty gas has been drawn through the filter at the inlet end is known, and the time required to discolor the clean end filter equal to that at the dirty end may readily be determined from the number of photographic exposures in the film strip, the efficiency of the gas cleaning device may be computed from the following formula:

$$\text{Per cent efficiency} = \frac{\text{Time (outlet)} - \text{Time (inlet)}}{\text{Time (outlet)}} \times 100$$

Where "Time (outlet)" is the time required for the cleaned gas at the outlet end of the cleaning device to discolor a filter disc equal to the discoloration of the filter disc at the gas inlet end of the cleaning device, and "Time (inlet)" is the predetermined interval during which dirty gas is drawn through the filter disc at the inlet end of the cleaning device.

What is claimed is:

1. The method of determining the efficiency of a gas cleaning device including the steps of drawing a sample of dust entrained gas from the inlet end of the gas cleaning device through a filtering medium to remove entrained particles therefrom, drawing a continuous sample of cleaned gas from the outlet end of the cleaning device through a filtering medium to remove any residually entrained foreign particles; making a single photograph of the inlet filter after a predetermined period of flow and then making a multiple exposure photographic record of the outlet filter until said filter is equal in discoloration to the inlet filter, whereupon the time required to produce an outlet filter discoloration similar to that at the inlet filter may be computed by determining the number of photographic exposures made before both filtering mediums arrive at a condition of equal discoloration.

2. The method of determining the cleaning efficiency of a gas cleaning device which includes the steps of withdrawing a sample of dust entrained gas from the inlet end of said device and passing it through a first filtering medium for a predetermined period of time; photographing the filtering medium to record the degree of discoloration due to the collection of filterable particles removed thereby; withdrawing a continuous sample of substantially clean gas from the outlet end of said device and passing it through a second filtering medium to remove residually entrained particles therefrom; photographically recording the second filtering medium at equally spaced intervals to record the varying degrees of discoloration due to filterable particles being removed thereby; and determining the time required to produce discoloration of the second filtering medium similar to that of said first medium by counting the number of photographic exposures made of said second filtering medium before the discoloration thereof equals in intensity the discoloration of the first filtering medium after said predetermined period of time.

3. The method of determining the cleaning efficiency of a gas cleaning device having a housing including an inlet end for the entrance of dust entrained gas to be cleaned and an outlet end for the discharge of cleaned gas therefrom, said method including the steps of withdrawing a quantity of dust entrained gas from the inlet end of said housing and directing it through a first filtering medium for a predetermined period of time; photographing the filtering medium to record the discoloration thereof due to concentration of filtered particles; withdrawing a continuous sample of substantially clean gas from the discharge end of said housing and directing it through a second filtering medium to remove residually entrained particles therefrom; photographing the second filtering medium at closely spaced intervals to record the varying degree of discoloration due to collection of filterable particles thereon; and determining the time required to produce discoloration of said second filtering medium to an extent comparable with the discoloration of said first filtering medium.

4. The method of determining the cleaning efficiency of a gas cleaning device as defined in claim 3 wherein the time required to produce discoloration of said second filtering medium to a degree comparable to that of said first filtering medium as determined by counting the number of photographic exposures made of said second filtering medium before discoloration thereof equals the intensity of discoloration attending said first filtering medium at the expiration of said predetermined period of time.

5. The method of determining the cleaning efficiency of a gas cleaning device as defined in claim 3 wherein the dust entrained gas drawn from the inlet end of the housing into the first filtering medium and the substantially clean gas drawn from the outlet end of the housing into the second filtering medium are withdrawn at substantially the same rate of flow.

References Cited in the file of this patent

UNITED STATES PATENTS

| | | |
|---|---|---|
| 1,044,835 | Wattles | Nov. 19, 1912 |
| 1,900,477 | Wittemeier | Mar. 7, 1933 |
| 2,019,871 | Pettingill et al. | Nov. 5, 1935 |
| 2,072,872 | Finkelstein | Mar. 9, 1937 |